United States Patent
Yi et al.

(10) Patent No.: US 10,530,551 B2
(45) Date of Patent: Jan. 7, 2020

(54) METHOD AND APPARATUS FOR DESIGNING DOWNLINK CONTROL INFORMATION IN WIRELESS COMMUNICATION SYSTEM

(71) Applicant: LG ELECTRONICS INC., Seoul (KR)

(72) Inventors: Yunjung Yi, Seoul (KR); Hyangsun You, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/560,124

(22) PCT Filed: Mar. 30, 2016

(86) PCT No.: PCT/KR2016/003264
§ 371 (c)(1),
(2) Date: Sep. 20, 2017

(87) PCT Pub. No.: WO2016/159656
PCT Pub. Date: Oct. 6, 2016

(65) Prior Publication Data
US 2018/0102890 A1    Apr. 12, 2018

Related U.S. Application Data

(60) Provisional application No. 62/139,808, filed on Mar. 30, 2015, provisional application No. 62/153,493, (Continued)

(51) Int. Cl.
*H04L 5/00* (2006.01)
*H04W 4/70* (2018.01)
(Continued)

(52) U.S. Cl.
CPC .......... *H04L 5/0053* (2013.01); *H04L 5/0037* (2013.01); *H04L 5/0044* (2013.01);
(Continued)

(58) Field of Classification Search
CPC ... H04L 5/0037; H04L 5/0044; H04L 5/0053; H04L 27/18; H04W 72/042; H04W 72/044; H04W 72/046; H04W 4/70
See application file for complete search history.

(56) References Cited

U.S. PATENT DOCUMENTS

2011/0103247 A1*  5/2011  Chen ................... H04B 7/0452
                                                    370/252
2013/0083753 A1   4/2013  Lee et al.
(Continued)

FOREIGN PATENT DOCUMENTS

EP   1162774   12/2001
EP   2117155   11/2009
(Continued)

OTHER PUBLICATIONS

Machine Translation for WO-2015030523 (Year: 2015).*
(Continued)

*Primary Examiner* — Paul H Masur
(74) *Attorney, Agent, or Firm* — Lee Hong Degerman Kang & Waimey

(57) ABSTRACT

A method and apparatus for allocating resources for a machine type communication user equipment (MTC UE) in a wireless communication system is provided. A base station indicates a transport block size (TBS) directly, adapts a code rate according to repetition numbers across multiple subframes in a MTC physical downlink shared channel (M-PDSCH) for the MTC UE, and allocates resources for the M-PDSCH by using the indicated transport block size
(Continued)

and the adapted code rate. The TBS may be determined based on a modulation and coding scheme (MCS) only.

6 Claims, 11 Drawing Sheets

Related U.S. Application Data filed on Apr. 27, 2015, provisional application No. 62/242,298, filed on Oct. 15, 2015, provisional application No. 62/256,022, filed on Nov. 16, 2015, provisional application No. 62/258,425, filed on Nov. 21, 2015.

(51) Int. Cl.
*H04L 27/18* (2006.01)
*H04W 88/08* (2009.01)

(52) U.S. Cl.
CPC .............. *H04L 27/18* (2013.01); *H04W 4/70* (2018.02); *H04W 88/08* (2013.01)

(56) References Cited

U.S. PATENT DOCUMENTS

| | | | |
|---|---|---|---|
| 2013/0163556 A1 | 6/2013 | Lee et al. | |
| 2013/0195041 A1* | 8/2013 | Papasakellariou | H04W 72/042 370/329 |
| 2014/0293908 A1* | 10/2014 | Kumar | H04W 48/12 370/329 |
| 2015/0237644 A1* | 8/2015 | Golitschek Edler von Elbwart | H04B 7/2656 370/329 |
| 2015/0271006 A1* | 9/2015 | Han | H04L 1/001 370/329 |
| 2016/0044644 A1* | 2/2016 | Lyu | H04L 5/0092 370/329 |
| 2016/0112898 A1* | 4/2016 | Chen | H04W 28/0215 370/235 |
| 2016/0226649 A1* | 8/2016 | Papasakellariou | H04L 5/0057 |
| 2016/0269939 A1* | 9/2016 | Papasakellariou | H04L 5/0053 |
| 2016/0285535 A1* | 9/2016 | Kim | H04L 5/0016 |
| 2017/0164335 A1* | 6/2017 | Yamamoto | H04L 5/0053 |
| 2017/0223725 A1* | 8/2017 | Xiong | H04L 5/0053 |
| 2017/0311294 A1* | 10/2017 | Kim | H04L 1/00 |
| 2018/0115962 A1* | 4/2018 | Kim | H04W 28/02 |
| 2018/0288750 A1* | 10/2018 | Yu | H04L 1/0003 |

FOREIGN PATENT DOCUMENTS

| | | | | |
|---|---|---|---|---|
| EP | 2635082 | | 9/2013 | |
| WO | WO-2015030523 A1 * | | 3/2015 | ........... H04L 5/0016 |

OTHER PUBLICATIONS

PCT International Application No. PCT/KR2016/003264, International Search Report dated Jul. 22, 2016, 2 pages.
NTT Docomo, "Views on PDSCH Coverage Enhancement", R1-135511, 3GPP TSG RAN WG1 Meeting #75, Nov. 2013, 4 pages.
NEC Group, "Downlink Reference Signal Enhancement for Low Cost MTC", R1-132334, 3GPP TSG RAN WG1 Meeting #73, May 2013, 6 pages.
European Patent Office Application No. 16773437.5, Search Report dated Sep. 28, 2018, 10 pages.

\* cited by examiner

METHOD AND APPARATUS FOR DESIGNING DOWNLINK CONTROL INFORMATION IN WIRELESS COMMUNICATION SYSTEM

CROSS-REFERENCE TO RELATED APPLICATIONS

[0] This application is the National Stage filing under 35 U.S.C. 371 of International Application No. PCT/KR2016/003264, filed on Mar. 30, 2016, which claims the benefit of U.S. Provisional Application No. 62/139,808, filed on Mar. 30, 2015, 62/153,493, filed on Apr. 27, 2015, 62/242,298, filed on Oct. 15, 2015, 62/256,022, filed on Nov. 16, 2015 and 62/258,425, filed on Nov. 21, 2015, the contents of which are all hereby incorporated by reference herein in their entirety.

BACKGROUND OF THE INVENTION

Field of the Invention

The present invention relates to wireless communications, and more particularly, to a method and apparatus for designing downlink control information (DCI) for a machine-type communication (MTC) user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

For MTC UE, new design of downlink control information (DCI) may be required.

SUMMARY OF THE INVENTION

The present invention provides a method and apparatus for designing downlink control information (DCI) for a machine-type communication (MTC) user equipment (UE) in a wireless communication system. The present invention provides a method and apparatus for designing DCI for coverage enhancement (CE)/normal MTC UE. The present invention discusses fields in the DCI, and particularly focuses on a resource allocation field in the DCI.

In an aspect, a method for allocating, by a base station, resources for a machine type communication user equipment (MTC UE) in a wireless communication system is provided. The method includes indicating a transport block size (TBS) directly, adapting a code rate according to repetition numbers across multiple subframes in a MTC physical downlink shared channel (M-PDSCH) for the MTC UE, and allocating resources for the M-PDSCH by using the indicated transport block size and the adapted code rate.

In another aspect, a base station in a wireless communication system is provided. The base station includes a memory, a transceiver, and a processor coupled to the memory and the transceiver. The processor is configured to indicate a transport block size (TBS) directly, adapt a code rate according to repetition numbers across multiple subframes in a machine type communication (MTC) physical downlink shared channel (M-PDSCH) for a MTC user equipment (UE), and allocate resources for the M-PDSCH by using the indicated transport block size and the adapted code rate. DCI for MTC UE can be designed efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
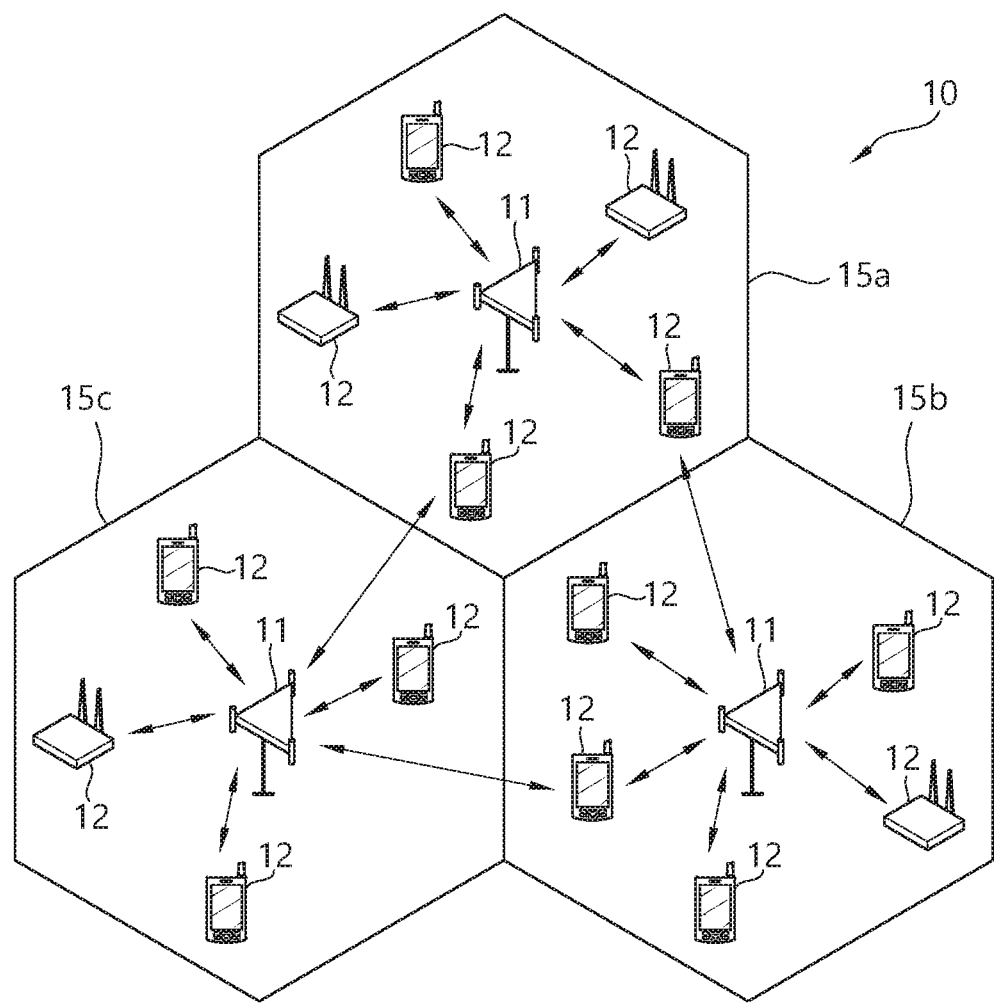
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
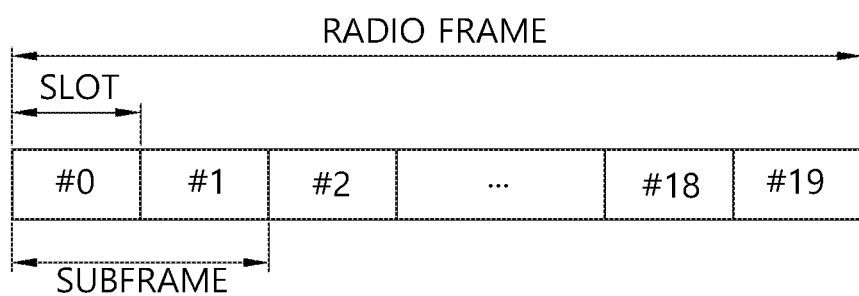
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
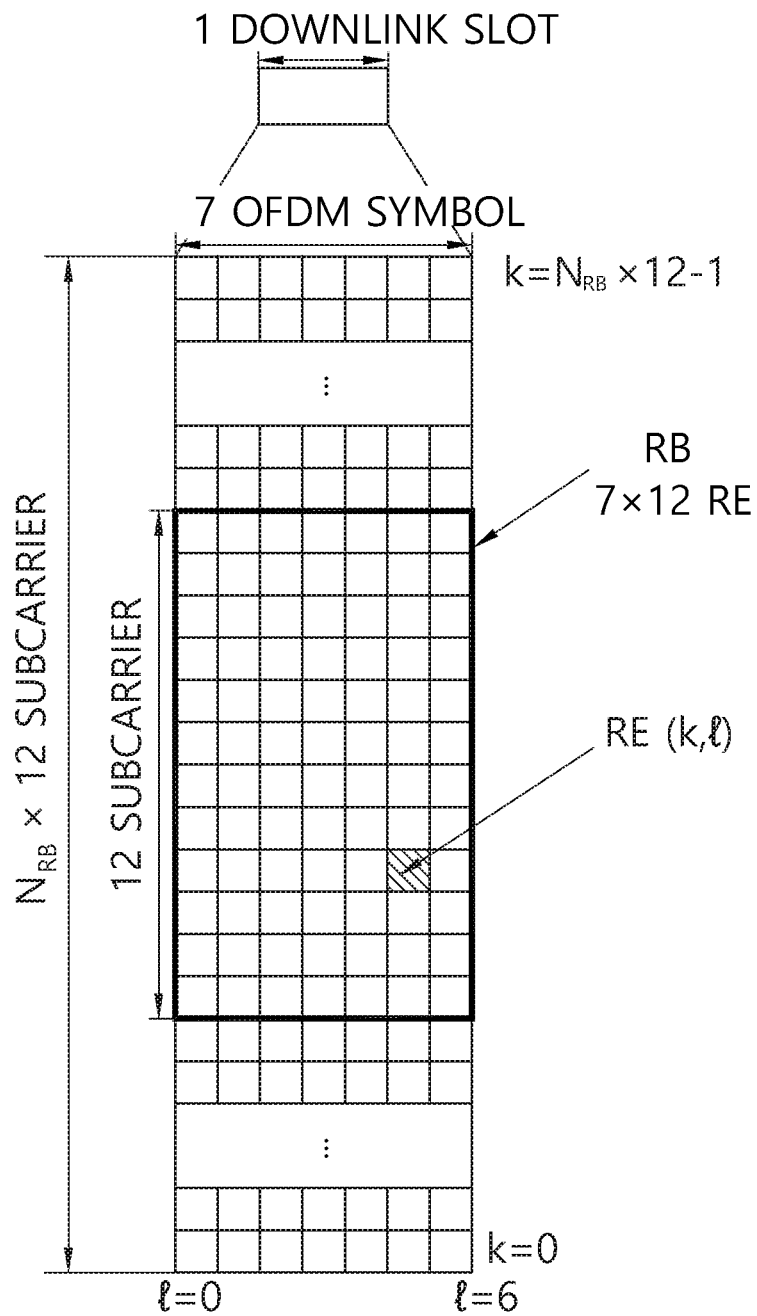
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
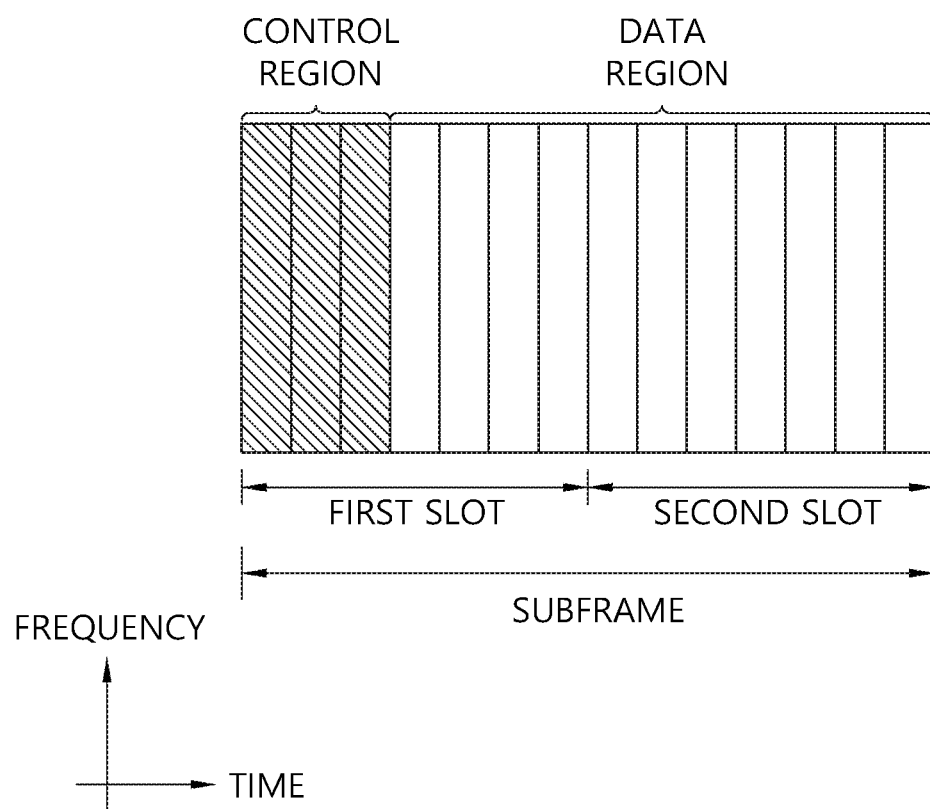
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
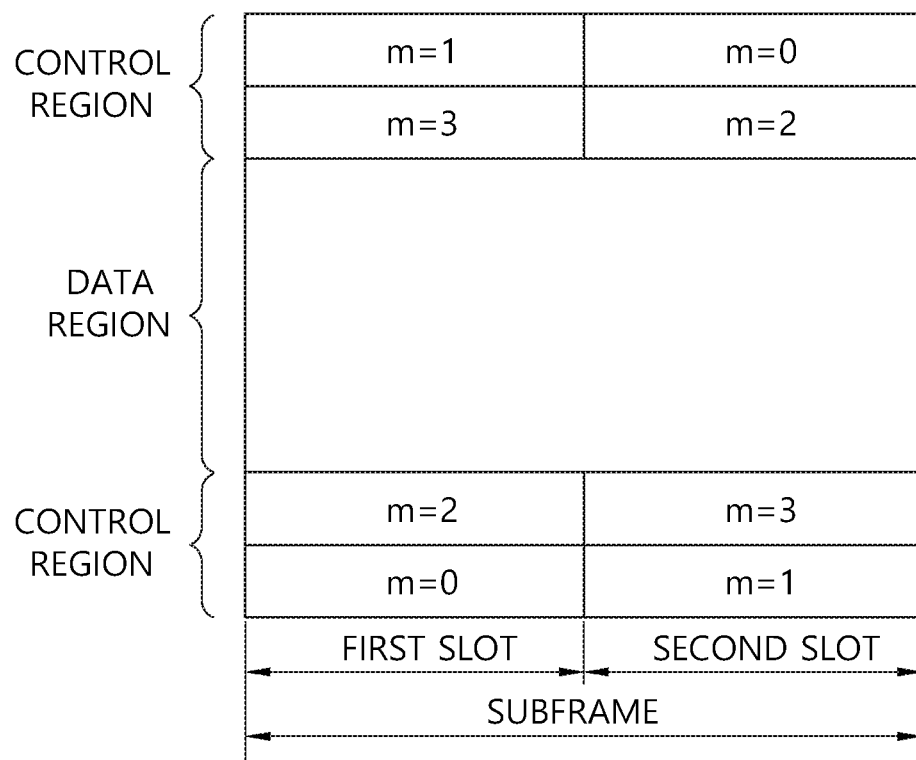
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification. Hereinafter, a MTC UE may be referred to as one of a UE requiring coverage enhancement (CE), a low cost UE, a low end UE, a low complexity UE, a narrow(er) band UE, a small(er) band UE, or a new category UE. Or, just a UE may refer one of UEs described above.

In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

If a system bandwidth is larger than 1.4 MHz, it is likely that more than one subband may be configured. A subband may refer to a resource allocation unit for MTC UE which may use a narrow bandwidth. A subband may be a part of a system bandwidth. Hereinafter, let's assume that there are M subbands configured for a system bandwidth. Since a UE cannot receive broadcast+unicast or broadcast+broadcast or unicast+unicast simultaneously, and also, a UE may require one slot or one subframe to perform frequency retuning if subband changes, careful considerations on multiplexing should be considered.

Among M subbands configuring the system bandwidth, it may be simply assumed that there is one subband carrying physical broadcast channel (PBCH), and another subband carrying system information block 1 for MTC (hereinafter MTC-SIB1), and another subband carrying system information block 2 for MTC (hereinafter MTC-SIB2), and so on. Each subband may be the same. Or, each subband may be configured by previous channel. For example, PBCH may configure a subband for MTC-SIB1, and MTC-SIB1 may configure a subband for MTC-SIB2. Regardless of subband, a cell-specific subband hopping pattern may be configured. For example, for subband i, it may jump to the location of subband j where j=fk (system frame number (SFN), cell ID). Here, k is the index of hopping pattern. This example shows that hopping occurs in every radio frame. However, the hopping may occur in multiple subframes rather than a radio frame unit.

For primary synchronization signal (PSS)/secondary synchronization signal (SSS)/PBCH reading, the UE may stay in the center 6 PRBs. Subband/frequency hopping may be disabled for PSS/SSS/PBCH. In other words, the center 6 PRBs may always be used to transmit PSS/SSS/PBCH.

For paging reading, if a UE is in RRC CONNECTED mode, a UE may assume that paging occurs in a subband where the UE is configured to monitor unicast data and/or control signal. If a UE is in RRC IDLE mode, a UE may assume that the paging subband is configured or indicated by the network based on UE ID or some other means. While a UE is reading paging, it may not be required to receive any other data/control signal until receiving paging message is completed.

For MTC-SIB1 reading, if the MTC-SIB1 is read since MTC-SIB1 update, a UE may not be required to receive any other data/control signal until the MTC-SIB1 reading is completed. If the MTC-SIB1 is read based on UE autonomous behavior (e.g. update SIB due to timer expiration, etc.), the UE may also read other unicast data. If there is on-going unicast transmission, the UE may not be required to receive SIB(s) simultaneously.

For other SIB(s), if a UE reads SIB(s) because of SIB(s) update, a UE may not be required to receive any unicast data until updating SIB(s) is completed.

Figure 6:
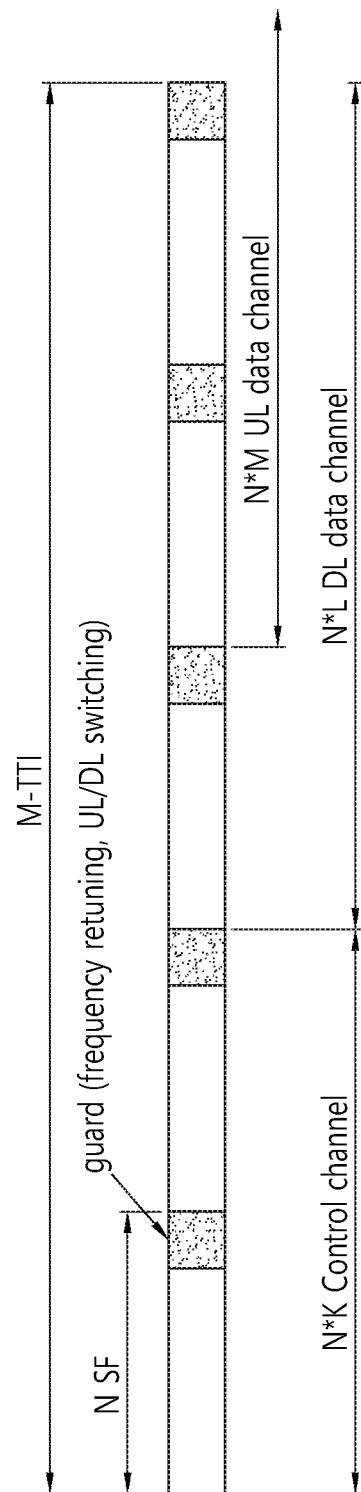
FIG. 6 shows an example of a frame structure for MTC according to an embodiment of the present invention.

FIG. 6 shows an example of a frame structure for MTC according to an embodiment of the present invention. Referring to FIG. 6, MTC-TTI (M-TTI) may be configured. M-TTI may refer to a time unit for transmitting data to MTC UEs. M-TTI may be longer than a conventional TTI described in FIG. 2 above. M-TTI may include multiple N subframes. In each N subframes, (N−1) subframes may be used for transmitting data to MTC UEs and channel estimation, and the remaining 1 subframe may be used as a guard period, which allows frequency retuning, UL/DL switching, etc. Frequency retuning gap may not be necessary if frequency retuning latency is small. In the M-TTI, N*K subframes may be used for control channel, and N*L subframes may be used for DL data channel. Further, N*M subframes may be used for UL data channel.

In designing of fields in DCI for a MTC UE in CE mode, it may be required to reduce the content of DCI. However, at the same time, DCI should be able to accommodate flexible operation of the system. Accordingly, for determining necessary fields in DCI, at least one of the following aspects may be considered.

Whether the CE level changes or not
Whether the number of subframes for repetition changes dynamically or not
Even if CE level does not change, how to determine the number of subframes for repetition given that transport block size (TBS) changes may be considered. When TBS changes, it may be better to change the number of scheduled RBs or the number of subframes.

In this case, it is assumed that the CE level, which corresponds to radio resource management (RRM) level signal to interference noise ratio (SINR), and HARQ process number (if supported number of HARQ process is 1) are semi-static. Further, it is not assumed that TBS, modulation and coding scheme (MCS) and new data indicator (NDI) are not semi-static.

Figure 7:
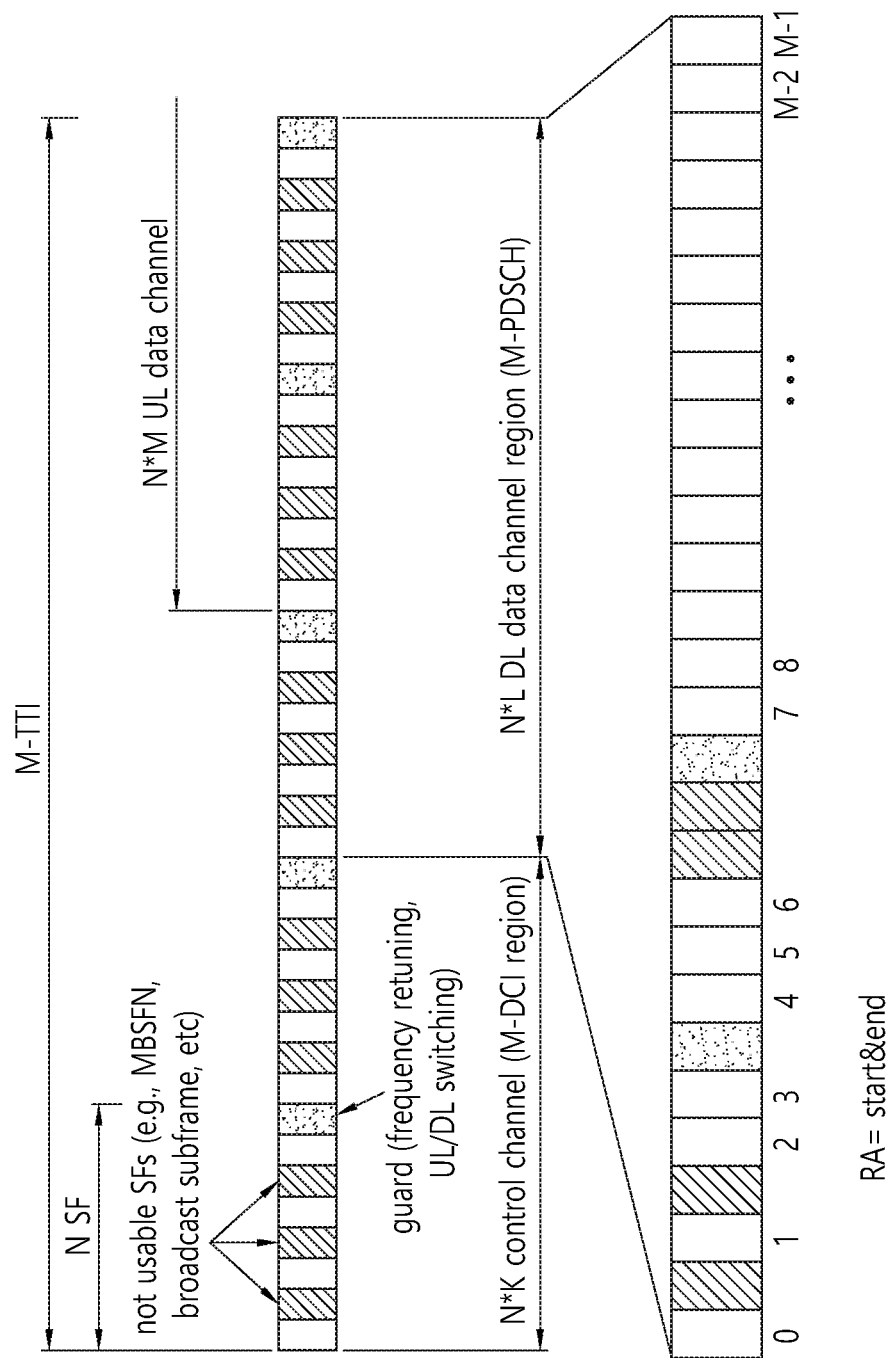
FIG. 7 shows another example of a frame structure for MTC according to an embodiment of the present invention.

FIG. 7 shows another example of a frame structure for MTC according to an embodiment of the present invention. The frame structure shown in FIG. 7 may be used for a MTC UE in CE mode. Referring to FIG. 7, from the perspective of a MTC UE in CE mode, one M-TTI consists of M-DCI region in which control channels are transmitted and M-PDSCH region in which data channels are transmitted. The M-DCI region includes N*K subframes, and the M-PDSCH region includes N*L subframes. M-TTI may consist of only M-PDSCH region if data is scheduled without the associated control channel. For example, if MTC-SIB 1 is transmitted without the associated control channel, M-TTI may consist of only M-PDSCH region. The size of M-TTI in terms of the number of subframes may be different from each other between M-TTI used for common data (e.g. SIB or RAR) and M-TTI used for unicast transmission. Further, the size of M-TTI may be different per UE or per subband when M-TTI is used per coverage enhancement level.

M-TTI may be overlapped where the starting subframe of M-TTI is determined by the starting subframes of PDCCH repetition (i.e. the set of subframes where the repeated PDCCH can start). However, a UE may expect to receive one control channel and data channel within one M-TTI. A UE may not be expected to receive another control channel and/or data channel, while it is receiving one control/data channel pair or UL grant control channel. Further, a UE may expect at most one DL grant and at most one UL grant in M-DCI region in each M-TTI, and at most one PDSCH in M-PDSCH region in each M-TTI.

Based on the frame structure for MTC describe above, resource allocation mechanism according to an embodiment of the present invention is described. As discussed earlier, TBS may vary per data scheduling, and possibly, MCS may also change. The amount of required resource to carry T bits of data, by using MCS value of I and repetition factor (or required number of repeated subframes) of R may vary depending on T, I, and R. That is, the overall required resource may be function of T, I, and R. Particularly, R may be function of T and I. For example, TBS=200 bits with MCS=0 may require 20 subframes of repetition, whereas TBS=1000 bits with MCS=0 may require 80 subframes of repetition.

Thus, in terms of allocating resource, a mechanism to indicate the number of repeated subframes either implicitly or explicitly may be needed. For implicit indication, the number of repeated subframes may be indicated by a combination of TBS and MCS, or a combination of resource allocation and MCS. The present invention discusses a few mechanisms for DCI fields to deliver the necessary information for the required resource, MCS and TBS.

Assuming that the overall required CE level is rather static or semi-static, the CE level may be determined by RRM measurement or CQI computation based on assumption of a fixed TBS and number of repeated subframes. It may be further assumed that CE level is configured to a UE rather than dynamically changing.

Hereinafter, resource allocation mechanisms according to an embodiment of the present invention is described in detail. It is assumed that a subband in which PDSCH is transmitted is fixed and 6 PRBs (or the number of RBs used in a subframe is higher layer configured) are always allocated to a UE. It is further assumed that 6 PRBs are known to the UE by other means, e.g. higher layer signaling, or implicit mapping between UE ID and subband location, etc. Resource allocation may assign start subframe and end subframe within M-PDSCH region. Accordingly, compact resource allocation mechanism may be used (or similar mechanism can be used). Similar to RB index, the subframes usable for MTC transmission within M-PDSCH region (i.e.

valid subframes) may be indexed from 0 to M−1. If M is larger than 100, which is currently assumed as the maximum number of RBs, it may be also further considered to group subframes so that the indices of subframes can be reduced to be less than 100 (or other maximum number K). K may determine the size of DCI. To minimize the size of DCI, it would be also desirable to reduce the size of K.

Further, resource block group (RBG) based resource allocation may be used over multiple subframes. In terms of grouping, RBG like grouping may be considered. For example, one subband RB (S-RB) may be defined as one or multiple narrowbands (i.e. subbands) which share the same index in M-PDSCH. If the size of M-PDSCH is larger than K, multiple subframes may have the same index in M-PDSCH. Further, S-RBG may consist of multiple of S-RBs. The size of S-RBG may be preconfigured or determined based on repetition/CE level or higher layer configured or dynamically signaled via DCI. When S-RBG is determined, resource allocation used for RBG may be reused. To align RBG concept, it may be mapped that K is mapped to the number of DL RBs such that the size of S-RBG may be determined assuming the same DL RB count to K. For example, if K=6, S-RBG size may be 1, and if K=15, S-RBG size may be 2, and so on. In other words, RBG mapping, DCI mapping, etc., may follow the same format assuming that K is the number of DL RBs.

Further, the number of assigned S-RBs may be used to determine TBS. For example, if N S-RBs are assigned for PDSCH repetition where M is the repetition number assuming TBS=1000, the TBS may be determined as (M*1000)/N.

Alternatively, TBS may be determined by a look-up table of TBS. Table 1 shows an example of TBS index ($I_{TBS}$) according to MCS index ($I_{MCS}$), modulation order (Qm) and CE level. Table 2 shows an example of a look-up table of TBS according to the TBS index ($I_{TBS}$) and the number of assigned S-RBs.

TABLE 1

| MCS Index ($I_{MCS}$) | Modulation Order ($Q_m$) | CE Level | TBS Index ($I_{TBS}$) |
|---|---|---|---|
| 0 | 2 | 1 | 0 |
| 1 | 2 | 1 | 1 |
| 2 | 2 | 1 | 2 |
| 3 | 2 | 1 | 3 |
| 4 | 4 | 1 | 4 |
| 5 | 4 | 1 | 5 |
| 6 | 4 | 1 | 6 |
| 7 | 4 | 1 | 7 |
| 0 | 2 | 2 | 8 |
| 1 | 2 | 2 | 9 |
| 2 | 2 | 2 | 10 |
| 3 | 2 | 2 | 11 |
| 4 | 4 | 2 | 12 |
| 5 | 4 | 2 | 13 |
| 6 | 4 | 2 | 14 |
| 7 | 4 | 2 | 15 |
| 0 | 2 | 3 | 16 |
| 1 | 2 | 3 | 17 |
| 2 | 2 | 3 | 18 |
| 3 | 2 | 3 | 19 |
| 4 | 4 | 3 | 20 |
| 5 | 4 | 3 | 21 |
| 6 | 4 | 3 | 22 |
| 7 | 4 | 3 | 23 |

TABLE 2

| $I_{TBS}$ | $N_{S-RB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1000 | 1000 |
| 8 | 16 | 32 | 56 | 88 | 120 | 152 | 176 | 208 | 224 | 256 |
| 9 | 24 | 56 | 88 | 144 | 176 | 208 | 224 | 256 | 328 | 344 |
| 10 | 32 | 72 | 144 | 176 | 208 | 256 | 296 | 328 | 376 | 424 |
| 11 | 40 | 104 | 176 | 208 | 256 | 328 | 392 | 440 | 504 | 568 |
| 12 | 56 | 120 | 208 | 256 | 328 | 408 | 488 | 552 | 632 | 696 |
| 13 | 72 | 144 | 224 | 328 | 424 | 504 | 600 | 680 | 776 | 872 |
| 14 | 328 | 176 | 256 | 392 | 504 | 600 | 712 | 808 | 936 | 1032 |
| 15 | 104 | 224 | 328 | 472 | 584 | 712 | 840 | 968 | 1000 | 1000 |
| 16 | 16 | 32 | 56 | 88 | 120 | 152 | 176 | 208 | 224 | 256 |
| 17 | 24 | 56 | 88 | 144 | 176 | 208 | 224 | 256 | 328 | 344 |
| 18 | 32 | 72 | 144 | 176 | 208 | 256 | 296 | 328 | 376 | 424 |
| 19 | 40 | 104 | 176 | 208 | 256 | 328 | 392 | 440 | 504 | 568 |
| 20 | 56 | 120 | 208 | 256 | 328 | 408 | 488 | 552 | 632 | 696 |
| 21 | 72 | 144 | 224 | 328 | 424 | 504 | 600 | 680 | 776 | 872 |
| 22 | 328 | 176 | 256 | 392 | 504 | 600 | 712 | 808 | 936 | 1032 |
| 23 | 104 | 224 | 328 | 472 | 584 | 712 | 840 | 968 | 1000 | 1000 |

According to Table 1, the TBS index (ITBS) may be determined based on MCS index ($I_{MCS}$), modulation order (Qm) and CE level. The TBS index ($I_{TMS}$) may range from 0 to 23. According to Table 2, TBS may be determined based on the TBS index ($I_{TBS}$) depending on the number of assigned S-RBs ($N_{S-RB}$).

In other words, TBS may be determined based on the number of S-RBs (scheduled subframes), MCS and CE level. Here, it is assumed that the number of subframes included in one S-RB may increase as the CE level increases. For example, if CE level is 1, only one subframe may be included in one S-RB, whereas if CE level is 2 (higher than 1), 4 subframes may be included in one S-RB.

In other words, the required number of repetition subframes may be determined by number of S-RB and the number of subframes included in one S-RB ($N_{sf}$). In this case, however, it may be assumed that M-PDSCH are shared by only UEs sharing the same CE level, as the Nsf is equal to all UEs scheduled in the same M-PDSCH region. To allow multiplexing among UEs with different CE levels, it may also be considered that S-RB may increase per CE level. In that case, TBS lookup table may be based on MCS and Ceil ($N_{S-RB}/N_{sf}$), where $N_{sf}$ may be implicitly determined by CE level or explicitly configured by higher layer. This may be extended in case that MCS bit size is larger than 3 bits.

In summary, according to an embodiment of the present invention, TBS may be determined by resource allocation or the number of subframes where data is scheduled, MCS and CE level (or equivalent information) configured to a UE, if a UE can assume that data is always mapped to 6 PRBs (or the subband or a number of RBs configured by higher layer). If the number of PRBs scheduled in a subframe is less than 6 PRBs, in terms of computing TBS, $N_{S-RB}$ may be computed as $N_{S-RB}$=ceil ($N_{S-RB}$*(the number of PRBs used in a subframe/6)). In other words, the number of S-RBs may be scaled down accordingly. Further, the number of RBs used per subframe in a DCI may be indicated by using a separate field.

For example, for CE level=3, the required number of repetition R is assumed as 100 with TBS=1000 bits and MCS=7. For the UE, the required number of repetition for DCI is assumed as 10 subframes with aggregation level of 1. In this case, assuming that all subframes can be used for MTC CE UEs, M-TTI size may be 10*3+100*3=330 subframes to accommodate 3 transmissions (multiplexing). Or, M-TTI size may be determined as 110 to accommodate only one UE in the worst case. For the UE, at least one of size of M-TTI, subframes usable for MTC UEs (or the subframes skipped/not used for MTC UEs), size of M-DCI, CE level or the number of repetitions or $N_{sf}$ may be known which may be higher layer configured or signaled via SIB.

In this example, $N_{sf}$ is assumed as 10. If M-PDSCH size is 300, the number of S-RBs is 30. If M-PDSCH size is 100, the number of S-RBs is 10. If S-RB size is 100, system bandwidth of 20 MHz (assuming 100 PRBs) resource allocation may be used. Thus, DCI size may be increased. To adapt the DCI size while allowing flexibility, configuration of $N_{sf}$ independent of CE level may also be considered.

Figure 8:
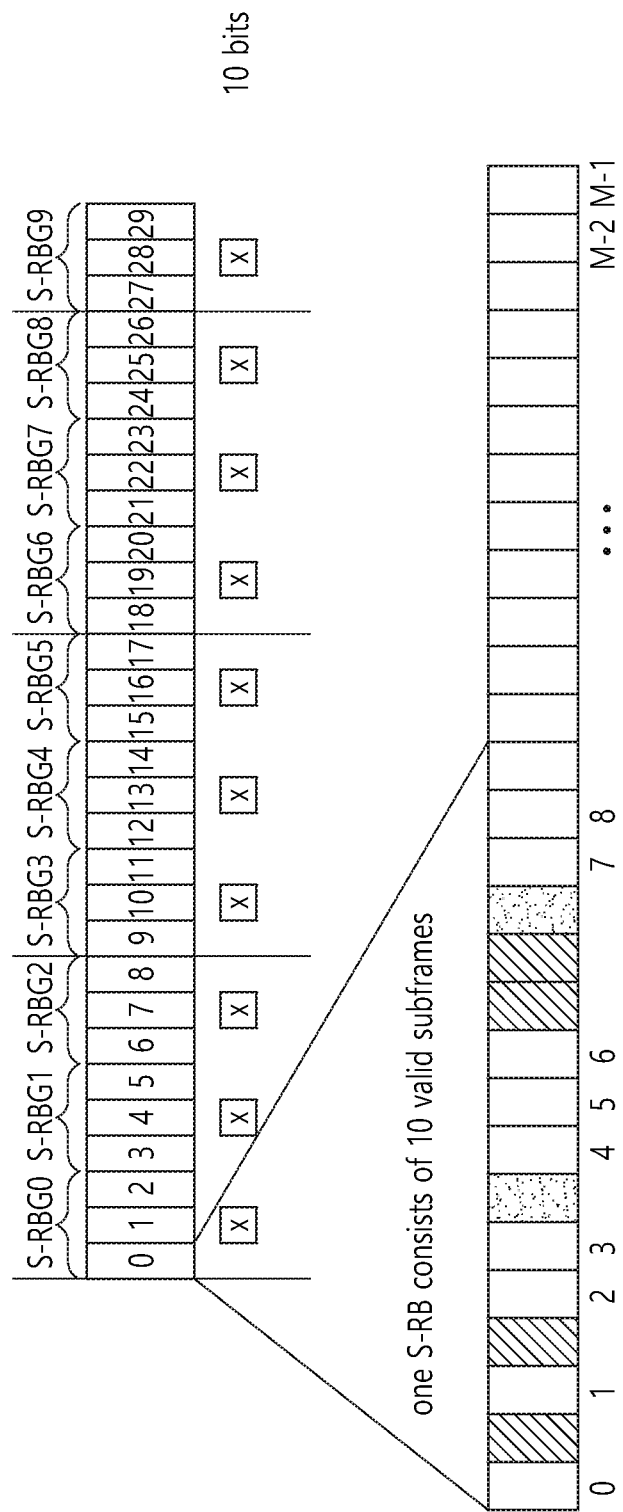
FIG. 8 shows an example of resource allocation utilizing RBG concept according to an embodiment of the present invention.

FIG. 8 shows an example of resource allocation utilizing RBG concept according to an embodiment of the present invention. Referring to FIG. 8, the number of S-RBs in an M-PDSCH, i.e. $N_{S-RB}$, is 30. The number of S-RBs in an S-RBG, i.e. P, is 10. S-RBs are distributed to P subsets, i.e. 30 S-RBs are distributed to 10 S-RBGs. Accordingly, one S-RBG includes 3 S-RBs. One S-RB may consist of 10 valid subframes. For example, if S-RB 0 is selected for resource allocation, subframes belonging to S-RB=0 (10 subframes) may carry the data for the UE.

Further, CE mode A and mode B may be supported. CE mode A corresponds to a mode where a UE is configured with either normal (or no repetition) or small repetition. CE mode B corresponds to a mode where a UE is configured with relatively large repetition. For determining TBS, TBS may be determined by utilizing CE level and MCS jointly. Code rate may be adjusted with minimum repetition number, and the UE may report MCS with the minimum repetition number. Alternatively, TBS may be determined only via MCS and code rate may be adjusted based on repetition number. If this is used, at least in CE mode B, quadrature phase shift keying (QPSK) may always be used and only MCS may be used for TBS index and CE level may be used for adapting code rate. As TBS changes dynamically, CE level needs to be adjusted as well. In CE mode A, MCS and resource allocation may be used jointly for TBS determination.

Type 2 resource allocation may be used where localized virtual resource block (LVRB) or continuous SF allocation may be used. Similar to distributed virtual resource block (DVRB), subframe shuffling may also occur. However, to minimize the receiving time, it is desirable to transmit data to a specific UE in a continuous manner as much as possible. Thus, continuous SF allocation may be assumed. The gap value may not be used in here. Only the start and length value may be presented.

In summary, the present invention proposes to signal the start subframe and duration of subframes used for data transmission via DCI. Furthermore, to minimize the DCI overhead, grouping of multiple subframes is proposed and/or a unit of S-RB is defined. Based on it, the present invention proposes to apply the current resource allocation mechanism by mapping the number of S-RB to system bandwidth. To support this, some necessary information described below may be signaled via SIB or higher layer signaling or RAR.

Subband location
Size of M-TTI
The subframes usable for MTC UEs (or the subframes skipped/not used for MTC UEs
Size of M-DCI or intended number of DCIs
CE level or repetition level
$N_{sf}$
Whether any interlace or multiplexing among UEs is achieved within one frequency-hopping subframe group (FH-SFG). FH-SFG is defined as a set of subframes in which a UE expects that frequency hopping would not occur within one FH-SFG. For example, FH-SFG can consist of 8 valid DL subframes usable for MTC DL transmission (or 8 valid UL subframes).
Whether any interlace or multiplexing among different PDSCHs with different HARQ-process IDs is used.
A bitmap of subframes in a FH-SFG which may be used for data transmission for a given UE. In the bitmap, HARQ-process ID may also be configured if multiplexing among different HARQ processes is utilized.
The location of frequency retuning gap subframe (or slot). Either first subframe or last subframe in a FH-SFG may also be configured (this may also be determined implicitly based on UE ID or C-RNTI).

Furthermore, based on resource allocation (or the number of subframes used for repetition), MCS, and CE level, the present invention discussed TBS computation mechanism.

In general, it may be good to minimize PUSCH resource fragmentation. To minimize PUSCH resource fragmentation, one possible approach is to schedule multiple PUSCHs sharing the same CE level at the same time. Since the resource needed for PUSCH may be limited to one PRB or less, the total number of resource unit used for PUSCH scheduling may be determined as the maximum number of DL subbands. For example, if PUSCH is scheduled over 3 subcarriers, and there are maximum 12 subbands allocated for MTC UEs, totally 3 PRBs may be used for possibly PUSCH transmission, and 12 location may be selected via resource allocation. In this case, 4 bits of resource allocation field may be sufficient. In other words, the number of bits used for resource allocation in UL grant may be determined by the total number of DL subbands used for MTC transmission. The reason is that the maximum number of UL grant scheduled at a time may be limited to the number of DL subbands if only one UL grant can be scheduled at each subband. However, since the repetition length of PUSCH may be much longer than DL control repetition, more resource may be needed. For example, if PUSCH repetition number is three times of control channel, during one PUSCH repetition, three UEs may be scheduled. Thus, three time PUSCH resource may be needed.

To support this, one approach is to signal subband together with PRB index within a subband. Alternatively, the entire resource may be indicated by a single value where the number of resource units may be determined by number of resource unit per PRB*number of PRBs in a subband*number of subbands allocated for MTC UEs. For example, if 1 resource unit per PRB is used in 10 MHz system bandwidth which are used for MTC UEs, 8 bits may be necessary to indicate the location of PUSCH resource.

Thus, the field necessary for DL scheduling may be as follows for the CE UEs.
- Resource block assignment: ceil (log 2 (number of subbands used for unicast DL transmissions)) bits. For example, in 10 MHz system bandwidth, 8 subbands may be used for unicast DL, and 3 bits may be used for resource allocation.
- MCS: 3 bits. Reduced MCS table may be used. This may determine TBS assuming 6 PRBs resource allocation.
- NDI: 1 bit. In case NDI is not toggled where the UE has successfully decoded the data before, the UE may skip monitoring PDSCH repetition. The UE may transmit PUCCH. By transmitting PUCCH immediately, so the network may stop transmitting PDSCH.

The field necessary for UL scheduling may be as follows for the CE UEs.
- Resource block assignment
- MCS: 3 bits (or fixed MCS may be assumed) p1 NDI: 1 bit
- Cyclic shift (CS) for demodulation reference signal (DM-RS): 3 bits (or reduced)

DCI for UL grant and DL grant may have different size. A UE may monitor both
DCIs with different sizes, thus, indication of DL grant or UL grant may not be necessary. However, to minimize the number of search space, a bit to indicate either UL grant or DL grant may be considered with the same size between two DCIs.

Further, CE mode A and mode B may be supported. CE mode A corresponds to a mode where a UE is configured with either normal (or no repetition) or small repetition. In terms of configuring each mode, it may be associated with CE level. As each mode targets different scenario, it is generally desirable to use different DCI (e.g. more flexibility in CE mode A and less DCI overhead in CE mode B).

Table 3 shows an example of unicast DL grant.

TABLE 3

| DCI contents | Field size for CE mode A | Field size for CE mode B | Description |
|---|---|---|---|
| UL/DL flag | 1 | 1 | This field will be present if size of DCI on DL grant and UL grant is same (including potential padding) |
| Narrowband index | [ceil(log2(number of narrowbands))] | FFS between 0 and the same size to CE mode A | In CE mode A, Case 1 is used, all narrowbands are addressable. In CE mode B, FFS between Case 1 and Case 2. If Case 1 is used, the same size is used as in CE mode A. Jointly encoding with "PRB assignment field" is not precluded. |
| PRB assignment | [5 or 6] | 0 | PRB location within the configured narrowband in narrowband index field. If field size 0 is agreed and separate coding from narrowband index is used, PDSCH is transmitted using 6 PRBs within the narrowband always for CE mode B. FFS to support discontinuous PRB assignment in CE mode A In CE mode B, 6 PRBs are always used for PDSCH scheduling. |
| Repetition number | [2 or 3] | [2 or 3] | The repetition number of PDSCH is dynamically indicated based on a set of values configured by higher layers. |
| MCS | [3 or 4] | [3 or 4] | Field size can be reduced from 5 bits. Joint encoding with repetition number is not precluded. |
| RV | 2 | 0 | For CE mode B, same RV mapping pattern is used for PDSCH transmission from PUSCH. |
| TPC for PUCCH | 2 | 0 | Agreed for CE modeB to use PCmax, c. TPC field in DL grant is used for PUCCH power adaptation for CE mode A. |
| NDI | 1 | 1 | |
| HARQ process number | 3 for FDD 4 for TDD | 1 | 3 bits for FDD, 4 bits for TDD for CE mode A. Agreed for CE mode B. |
| SRS request | [0 or 1] | 0 | Agreed: At least for CE mode B, LC/CE UE does not support SRS transmission. FFS for CE mode A |

TABLE 3-continued

| DCI contents | Field size for CE mode A | Field size for CE mode B | Description |
|---|---|---|---|
| DAI | 0 for FDD<br>2 for TDD<br>0 for HD-FDD | 0 | |
| HARQ-ACK resource offset | 2 | [0 or 1 or 2] | Agreed for CE mode A. FFS for CE mode B. |
| M-PDCCH repetition number | 2 | 2 | Agreed |

For indication of M-PDCCH order in CE mode B, narrowband index size may be 1 in 6 PRB, 1 in 15 PRB, 2 in 25 PRB, 3 in 50 PRB, 4 in 100 PRB, 4 in 75 PRBs. Since the bit size is always tightly fit with the number of narrowbands, this field may not be used for indicating M-PDCCH order even if it is s introduced. To support either M-PDCCH order or semi-persistent scheduling (SPS) particularly in CE mode B, it is necessary to reserve some bits in each field to indicate either M-PDCCH order SPS.

For M-PDCCH, narrowband index may be always one entry additional compared to the needed. For example, for 6 PRBs, 1 bit '0' may indicate narrowband index 0 and 1 bit '1' may indicate M-PDCCH order. For 15 PRBs, 2 bits '11' may indicate M-PDCCH order. For 25 PRBs, 3 bits '111' may indicate M-PDCCH order. For 50 PRBs, 4 bits '1111' may indicate M-PDCCH order. For 75 PRBs, 4 bits '1111' may indicate M-PDCCH order. Another approach is to add one bit of M-PDCCH order in DL or UL grant, which will be used to indicate M-PDCCH order triggered. Another approach is to use MCS field and repetition number field to be set to all '1' for M-PDCCH order.

For SPS grant, value of '0' may be used for validation, and value of '0' for repetition number and '1' for MCS may be used for release. If this is used, preamble index size may need to be adjusted from 6 to smaller size.

Another approach is to use reserved bits in MCS. For example, in case 4 bits is used for MCS, '1111' may be used for SPS release, '1110' may be used for SPS validation (in this case, MCS value for SPS may be prefixed or RRC configured), and '1101' may be used for M-PDCCH order. If 5 bits are used, some bits may be reserved for these purposes.

In CE mode A, narrowband index and PRB assignments may be assigned with all '0' for M-PDCCH order. MCS/repetition number may be used for SPS release/validation.

For CE mode B, contention based PRACH may be only supported such that preamble index is always set as 0 for the remaining fields (in other words, all fields except for necessary field(s) to indicate M-PDCCH order), and 2 bits may be used to indicate PRACH resource to use. Alternatively, current CE level may be used to locate PRACH resource from SIB for PRACH transmission. In such a case, no field is necessary, and the remaining field may be set to '1' for M-PDCCH order. In other words, other than the M-PDCCH repetition number, all other fields may be set to '1' for M-PDCCH order.

Table 4 shows an example of M-PDDCH order.

TABLE 4

| DCI contents | Field size for CE mode A | Field size for CE mode B |
|---|---|---|
| UL/DL flag | 1 | 1 |
| Narrowband index | Set to '1's | Set to '1's |
| PRB assignment | Set to '0' in case bitmap is used, set to '1' in case resource allocation type 2 is used | 0 |
| Repetition number | Set to '1's | Set to '1's |
| MCS | Set to prefixed value for M-PDCCH order or set to '0's or used for mask index | Set to prefixed value for M-PDCCH order or set to '0's |
| RV | Used for PRACH index indication | 0 |
| TPC for PUCCH | Used for PREAMBLE index | 0 |
| NDI | | Set to '0' or '1' |
| HARQ process number | | Set to '0' or '1' |
| SRS request | [0 or 1] | 0 |
| DAI | Used for mask index | 0 |
| HARQ-ACK resource offset | | Set to '0' or '11' |
| M-PDCCH repetition number | 2 | 2 |

Table 5 shows an example of SPS validation for CE mode A/B (if applicable).

TABLE 5

| | DCI format M0A | DCI format M1A | DCI format M0B | DCI format M1B |
|---|---|---|---|---|
| TPC command for scheduled PUSCH | set to '00' | N/A | N/A | N/A |
| Cyclic shift DM RS | set to '000' | N/A | N/A | N/A |
| Modulation and coding scheme and redundancy version | MSB is set to '0' or use prefixed SPS validation number | N/A | MSB is set to '0' or use prefixed SPS validation number | MSB is set to '0' or use prefixed SPS validation number |
| HARQ process number | FDD: set to '000'<br>TDD: set to '0000' | FDD: set to '000'<br>TDD: set to '0000' | FDD: set to '0'<br>TDD: set to '0' | FDD: set to '0'<br>TDD: set to '0' |
| Modulation and coding scheme | N/A | MSB is set to '0' or use prefixed SPS validation number | N/A | N/A |

TABLE 5-continued

|  | DCI format M0A | DCI format M1A | DCI format M0B | DCI format M1B |
|---|---|---|---|---|
| Redundancy version Repetition number | N/A | set to '00' | N/A | N/A |

Table 6 shows an example of SPS release.

TABLE 6

|  | DCI format M0A | DCI format M1A | DCI format M0B | DCI format M1B |
|---|---|---|---|---|
| TPC command for scheduled PUSCH | set to '00' | N/A | N/A | N/A |
| Cyclic shift DM RS | set to '000' | N/A | N/A | N/A |
| Modulation and coding scheme and redundancy version | set to '11111' or '1111' or use prefixed SPS release number | N/A | set to '11111' or '1111' or use prefixed SPS release number | set to '11111' or '1111' or use prefixed SPS release number |
| HARQ process number | FDD: set to '000' TDD: set to '0000' | FDD: set to '000' TDD: set to '0000' | FDD: set to '0' TDD: set to '0' | FDD: set to '0' TDD: set to '0' |
| Modulation and coding scheme | N/A | set to '11111' or '1111' or use prefixed SPS release number | N/A | N/A |
| Redundancy version Repetition number | N/A | set to '00' | N/A | N/A |

Table 7 shows an example of UL grant.

TABLE 7

|  | DCI format M0A | DCI format M1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

In case a UE is configured with rather frequency or short interval of control channel monitoring, it is possible that a UE may need to consume huge power to monitor all possible control channel monitoring subframes. One mitigation solution is to consider to add a bit in DCI for both DL grant and UL grant which indicates whether there will be the next scheduling or not. For example, a UE may be configured with MasterPeriodicity of control channel which may be configured (e.g. 200 ms), where the starting subframe of control channel may be configured in every 10 ms assuming that the repetition of one control channel may occur over 10 subframes generally. In this case, a UE may be supposed to monitor each 10 ms to decode control channel. In case a DCI indicates that there will be no scheduling, a UE may sleep until the next MasterPeriodicity interval. However, this does not prevent a UE to monitor all control channels if there is no scheduling. Another approach is to transmit a DCI including which UEs are scheduled during the MasterPeriodicity such that other UEs can go back to sleep rather than monitoring the DL channels.

For this, DCI format 3/3A may be used per group of UEs. MasterPeriodicity may be different per UE and may be configured via higher layer signaling. It may also be considerable to have a cell common value as well. This DCI, which may be called scheduling intention DCI (SI-DCI), may be read from a common channel subband. Further, this may also be used for scheduling sequence where the UE may wake up only at its designated scheduling opportunity to monitor control channel. To minimize the size of DCI format 3/3A, it may be transmitted per subband as well. If the UE cannot locate SI-DCI, the UE may monitor all control channel occasions.

Figure 9:
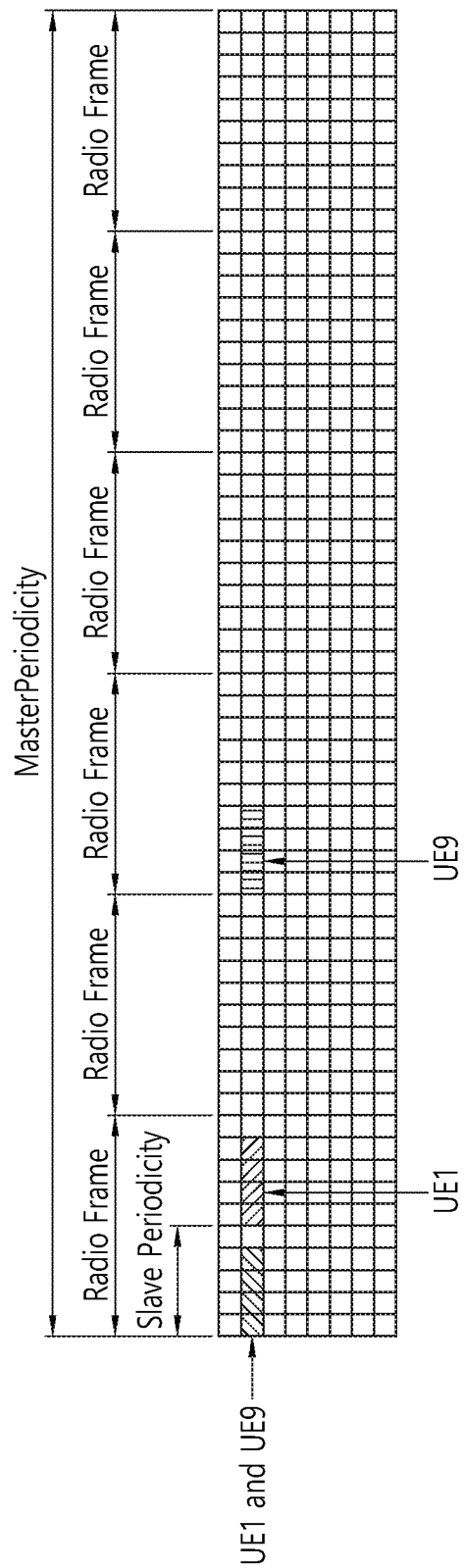
FIG. 9 shows an example of scheduling of UEs according to an embodiment of the present invention.

FIG. 9 shows an example of scheduling of UEs according to an embodiment of the present invention. Referring to FIG. 9, MasterPeriodicity of control channel is configured, and SI-DCI indicates which UEs are scheduled during the MasterPeriodicity. For example, SI-DCI may include [1 0 0 1] for UE1, UE3, UE5, UE9, and accordingly, UE1 and UE9 are scheduled in MasterPeriodicity. Further, SI-DCI may further include a bitmap of each SlavePeriodicity whether control channel will be transmitted or not.

Additionally, only intention of DCI in each SlavePeriodicity may also be considerable instead of giving indication to each UE.

Another approach is to assume that a UE does not need to monitor any further UL grant or DL grant within one MasterPeriodicity, if it successfully decodes one. In other words, a UE is not expected to be scheduled more than one time within a MasterPeriodicity for a new data. In case of retransmission, a UE still needs to monitor control channel to monitor retransmission.

Another approach is to configure interval between two consecutive control channel transmissions, and a UE may not have to monitor control channel if it detects one until the next interval. However, control channel for retransmission and/or ACK/NACK should be monitored regardless of this configuration. This applies only for control channel for new data transmission/grant.

Another approach is to use discontinuous reception (DRX) mechanism. A UE may be configured with a DRX configuration where a UE detects control channel during OnState. Control channel may have indication that whether there will be any further control channel or not within the current interval. In other words, MasterPeriodicity may be defined as DRX cycle where OnDuration may be configured to have one or multiple SlavePeriodicity. In scheduling control, it may have indication for further scheduling or not. In case no additional scheduling is indicated, a UE may not need to monitor control channel further other than control channel and/or ACK/NACK channel related to retransmission. More specifically, when a UE has received DL scheduling, if the indication indicates that no additional scheduling is expected, this option may not be so useful, as there is no guarantee on timing of DL retransmission. To enhance this approach, fixed retransmission time may be considered. Alternatively, retransmission may happen in the next DRX. When a UE has received UL grant, if the indication is not triggered, the UE may not need to monitor DL until PHICH timing.

Alternatively, this may be easily achievable with DRX and the assumption that both DL and UL grants are not occurred simultaneously. Until either one finishes, the other one cannot start. Based on this, when a UE detects a control channel during OnDuration, the UE may not need to monitor control channel, while the UE receives or transmits the scheduled data.

Figure 10:
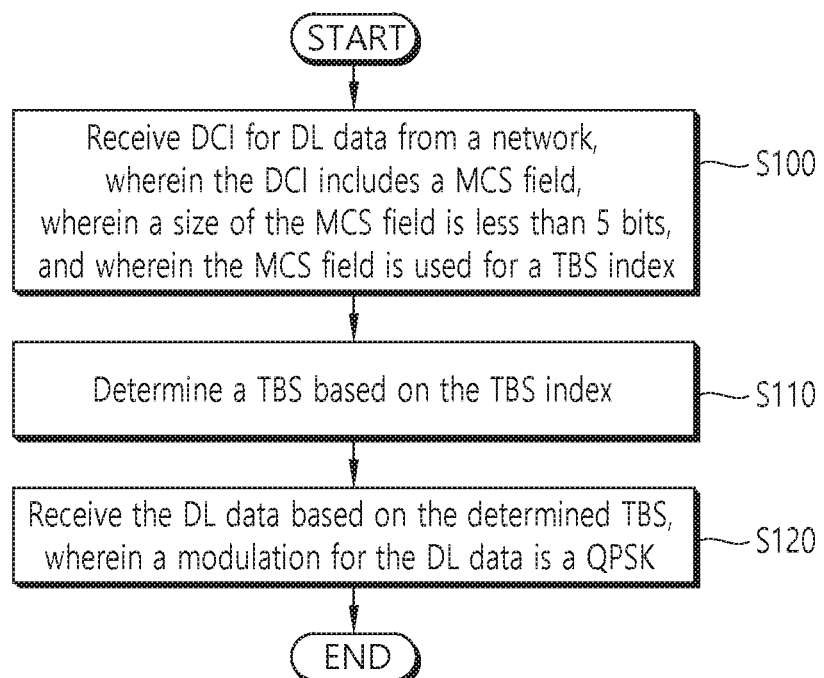
FIG. 10 shows an example of a method for allocating resource for a MTC UE according to an embodiment of the present invention.

FIG. 10 shows an example of a method for receiving DL data for a MTC UE according to an embodiment of the present invention.

In step S100, the UE receives DCI for DL data from a network. The DCI includes a MCS field, A size of the MCS field is less than 5 bits. The MCS field is used for a TBS index. In step S110, the UE determines a TBS based on the TBS index. In step S120, the UE receives the DL data based on the determined TBS. A modulation for the DL data is a QPSK.

The MTC UE may be in CE mode B.

The modulation for the DL data may be fixed as the QPSK, but may not be determined based on the MCS field. The DL data may be mapped to 6 physical resource blocks (PRBs).

Figure 11:
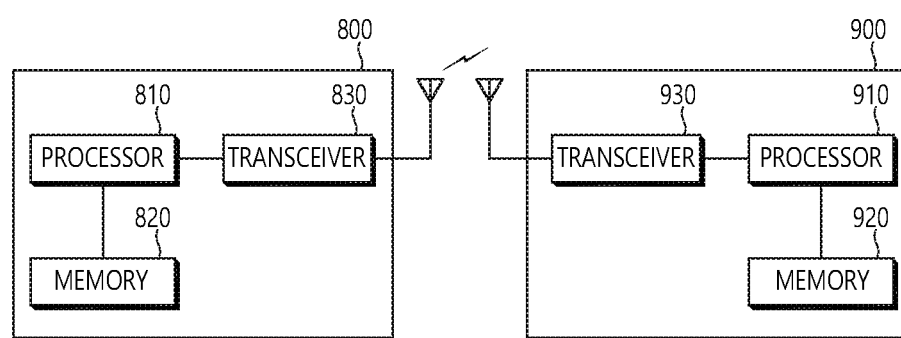
FIG. 11 shows a wireless communication system to implement an embodiment of the present invention.

FIG. 11 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
receiving downlink control information (DCI) for downlink (DL) data from a network, wherein the DCI includes a modulation and coding scheme (MCS) field, wherein a size of the MCS field is less than 5 bits, and wherein the MCS field is used for a transport block size (TBS) index;
determining a TBS based on the TBS index; and
receiving the DL data based on the determined TBS, wherein a modulation for the DL data is a quadrature phase shift keying (QPSK).

2. The method of claim 1, wherein the UE is a machine-type communication (MTC) UE, and
wherein the MTC UE is in coverage enhancement (CE) mode B.

3. The method of claim 1, wherein the modulation for the DL data is fixed as the QPSK, but not determined based on the MCS field.

4. The method of claim 1, wherein the DL data is mapped to 6 physical resource blocks (PRBs).

5. A user equipment (UE) in a wireless communication system, the UE comprising:
a memory;
a transceiver; and
a processor, operably coupled to the memory and the transceiver, that:
controls the transceiver to receive downlink control information (DCI) for downlink (DL) data from a network, wherein the DCI includes a modulation and coding scheme (MCS) field, wherein a size of the MCS field is less than 5 bits, and wherein the MCS field is used for a transport block size (TBS) index,
determines a transport block size (TBS) based on the TBS index; and controls the transceiver to receive the DL data based on the determined TBS, wherein a modulation for the DL data is a quadrature phase shift keying (QPSK).

6. The UE of claim 5, wherein the modulation for the DL data is fixed as the QPSK, but not determined based on the information on the MCS field.

* * * * *